United States Patent
Tuo et al.

(10) Patent No.: US 12,299,551 B2
(45) Date of Patent: May 13, 2025

(54) ACCOUNT PREDICTION USING MACHINE LEARNING

(71) Applicant: INTUIT INC., Mountain View, CA (US)

(72) Inventors: Shanshan Tuo, San Jose, CA (US); Neo Yuchen, Mountain View, CA (US); Divya Beeram, Newwark, CA (US); Valentin Vrzheshch, Mountain View, CA (US); Tomer Tal, Cupertino, CA (US); Ngoc Nhung Ho, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 952 days.

(21) Appl. No.: 16/927,655

(22) Filed: Jul. 13, 2020

(65) Prior Publication Data

US 2022/0012643 A1 Jan. 13, 2022

(51) Int. Cl.
*G06N 20/20* (2019.01)
*G06F 16/9535* (2019.01)
*G06F 18/214* (2023.01)
*G06N 3/049* (2023.01)

(52) U.S. Cl.
CPC ......... *G06N 20/20* (2019.01); *G06F 16/9535* (2019.01); *G06F 18/2148* (2023.01); *G06N 3/049* (2013.01)

(58) Field of Classification Search
CPC ..... G06N 20/20; G06N 3/049; G06F 18/2148
See application file for complete search history.

(56) References Cited

U.S. PATENT DOCUMENTS

| 2014/0279753 | A1 | 9/2014 | Dalessandro et al. |
| 2016/0162576 | A1* | 6/2016 | Ariño de la Rubia ...... G06F 21/602 707/739 |
| 2017/0243107 | A1* | 8/2017 | Jolley ...... G06N 5/02 |

(Continued)

FOREIGN PATENT DOCUMENTS

WO 2019126874 A 7/2019

OTHER PUBLICATIONS

Moon et al, "Ensemble methods for classification of patients for personalized medicine with high-dimensional data", 2007, Artificial Intelligence in Medicine, vol. 41, Iss. 3, pp. 197-207. (Year: 2007).*

(Continued)

*Primary Examiner* — Alexey Shmatov
*Assistant Examiner* — Clint Mullinax
(74) *Attorney, Agent, or Firm* — Patterson + Sheridan, LLP

(57) ABSTRACT

Aspects of the present disclosure provide techniques for training a machine learning model. Embodiments include receiving a historical support record comprising time-stamped actions, a support initiation time, and an account indication. Embodiments include determining features of the historical support record based at least on differences between times of the time-stamped actions and the support initiation time. Embodiments include determining a label for the features based on the account indication. Embodiments include training an ensemble model, using training data comprising the features and the label, to determine an indication of an account in response to input features, wherein the ensemble model comprises a plurality of tree-based models and a ranking model.

17 Claims, 6 Drawing Sheets

(56) References Cited

U.S. PATENT DOCUMENTS

| | | | |
|---|---|---|---|
| 2020/0019420 A1 | 1/2020 | Saimani et al. | |
| 2021/0240774 A1* | 8/2021 | Bikumala | G06N 3/08 |
| 2021/0319894 A1* | 10/2021 | Sobol | G06N 7/01 |
| 2022/0039756 A1* | 2/2022 | Mikhno | A61B 5/14532 |

OTHER PUBLICATIONS

Jain et al, "Other times, other values, Leveraging attribute history to link user profiles across online social networks", 2015, Proceedings of the 26th ACM Conference on Hypertext & Social Media, pp. 247-255. (Year: 2015).*

Yan et al, "LSTM2: Multi-Label Ranking for Document Classification", 2017, Neural Processing Letters, vol. 47, pp. 117-138. (Year: 2017).*

Cornelis et al, "Improving the Customer Support and Satisfaction Process Using Customer Feedback Text Mining and Analyzing Usage Data", 2017, Master of Science in Business Engineering: Data Analytics, all pages. (Year: 2017).*

Cornelius et al ("Improving the Customer Support and Satisfaction Process Using Customer Feedback Text Mining and Analyzing Usage Data", 2017, Master of Science in Business Engineering: Data Analytics, all pages. (Year: 2017).*

Molino et al ("COTA: Improving the Speed and Accuracy of Customer Support through Ranking and Deep Networks", 2018, KDD '18: Proceedings of the 24th ACM SIGKDD International Conference on Knowledge Discovery & Data Mining, pp. 586-595. (Year: 2018).*

International Search Report/ Written Opinion issued to PCT/US2021/032158 on Aug. 13, 2021.

* cited by examiner

ACCOUNT PREDICTION USING MACHINE LEARNING

INTRODUCTION

Aspects of the present disclosure relate to techniques for intelligent account prediction using machine learning.

BACKGROUND

As software applications become a ubiquitous part of life, efficient support for users of applications has become increasingly important. In many cases, applications are used to perform tasks that are critical to business and personal life, such as accounting and tax preparation applications. Providers of applications generally offer support services to users, including automated support and assisted support, so that problems may be addressed quickly and users remain satisfied with their experience of these applications.

When a user initiates a support session, such as by calling a support line, a support system may attempt to automatically determine certain aspects of why the user is calling. For example, the support system may determine the identity of the user and an account about which the user is calling. In some cases, a user may have multiple accounts for a single application. For example, a user of an accounting application may have a personal account as well as accounts for one or more businesses. As such, even if the identity of the user can be determined, such as based on the user's phone number, it may be difficult to automatically determine which of multiple accounts the user's support request relates to.

What is needed is a solution for accurate automatic prediction of an account related to a support request, particularly for users that have multiple accounts with an application.

BRIEF SUMMARY

Certain embodiments provide a method for training a machine learning model. The method generally includes: receiving a historical support record comprising time-stamped actions, a support initiation time, and an account indication; determining features of the historical support record based at least on differences between times of the time-stamped actions and the support initiation time; determining a label for the features based on the account indication; and training an ensemble model, using training data comprising the features and the label, to determine an indication of an account in response to input features, wherein the ensemble model comprises a plurality of tree-based models and a ranking model.

Other embodiments provide a system comprising one or more processors and a non-transitory computer-readable medium comprising instructions that, when executed by the one or more processors, cause the system to perform a method for training a machine learning model. The method generally includes: receiving a historical support record comprising time-stamped actions, a support initiation time, and an account indication; determining features of the historical support record based at least on differences between times of the time-stamped actions and the support initiation time; determining a label for the features based on the account indication; and training an ensemble model, using training data comprising the features and the label, to determine an indication of an account in response to input features, wherein the ensemble model comprises a plurality of tree-based models and a ranking model.

Other embodiments provide a method for account prediction using a trained ensemble model. The method generally includes: determining that a support session has been initiated by a user with a plurality of accounts with an application; gathering context information related to the support session, wherein the context information includes: a support initiation time; and time-stamped actions preceding the support session; determining differences between times of the time-stamped actions and the support initiation time; providing input features to an ensemble model based on the differences between the times of the time-stamped actions and the support initiation time, wherein the ensemble model comprises a plurality of tree-based models and a ranking model; and determining, based on output from the ensemble model in response to the input features, an account of the plurality of accounts that the support sessions is likely to relate to.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer readable mediums for intelligent account prediction using machine learning.

A user may have multiple accounts with an application, such as an accounting or tax preparation application. As such, when a user initiates a support session, it may be difficult to automatically determine which account the user is seeking support for based on limited information known about the user upon initiating the session, such as the identity of the user.

Embodiments of the present disclosure utilize machine learning techniques to predict an account related to a support request from a user of an application based on context information, such as user activities in the application. In some embodiments, an ensemble model is trained for account prediction based on historical context data associated with historical support requests for which the account is known (e.g., based on input from the user or a support professional). Different sets of features may be used to train each model in the ensemble model, as described in more detail below. The use of multiple models in an ensemble model, with different sets of features being used to train each model, allows for different machine learning techniques and/or different inputs to be utilized together in order to produce a more accurate result, such as based on majority voting of the different models. Training and usage of the ensemble model is described in more detail below.

When a user initiates a support session, a user identifier is determined for the user (e.g., based on a phone number from which the user calls), and is used to access user context data. The user context data is then used to provide inputs to the trained ensemble model, which outputs a predicted account for the support session. The predicted account may be used to perform one or more actions, such as providing support content to the user based on the predicted account, notifying a support professional of the predicted account, and/or automatically opening a support ticket based on the predicted account.

Example Computing Environment

Figure 1:
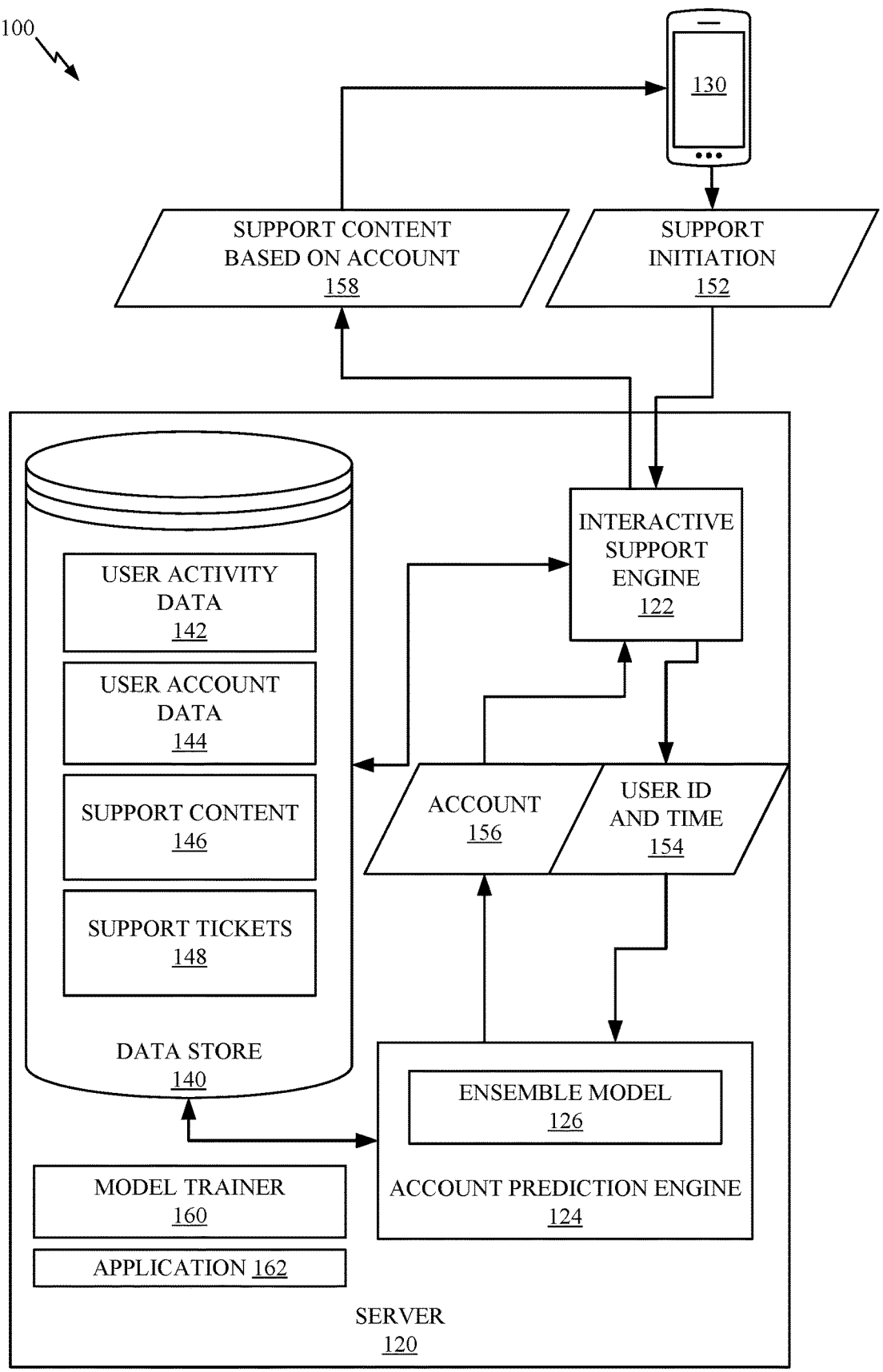
FIG. 1 depicts an example computing environment for account prediction using machine learning.

FIG. 1 illustrates an example computing environment 100 for account prediction using machine learning.

Computing environment 100 includes a server 120. In some embodiments, server 120 is connected to one or more networks over which data may be transmitted, such as a wide area network (WAN), local area network (LAN), cellular data network, and/or the like.

Server 120 generally represents a computing device such as a server computer. Server 120 includes an application 162, which generally represents a computing application that a user interacts with over network 110 via a client device. In some embodiments, application 122 is accessed via a user interface associated with a client device. In one example, application 122 is a financial services application such as an accounting application.

Server 120 further includes an interactive support engine 122, which handles support requests from users of application 162. For example, a user may call a support line using a mobile device 130, and interactive support engine 122 may receive information related to the call (e.g., support initiation data 152), such as a phone number and time of the support initiation. Interactive support engine 122 interacts with an account prediction engine 124, which employs techniques described herein to predict an account related to the support request through the use of an ensemble model 126 that has been trained using techniques described herein by a model trainer 160. In alternative embodiments, model trainer 160 is located on a separate system from server 120 (not shown). Interactive support engine 122 may provide automated support services, such as through an automated interactive voice system, to the user of mobile device 130 based on the predicted account (e.g., support content 158), and/or may notify an assisted support professional of the predicted account.

Data store 140 generally represents a data storage entity such as a database or repository that stores user activity data 142, user account data 144, support content 146, and support tickets 148. User activity data 142 includes timestamped actions performed by users within application 162, including page names on which the actions took place and information about the actions performed (e.g., clicking on particular user interface elements). User account data 144 includes information about accounts of users of application 162, such as mappings of users to accounts as well as attributes of the accounts, such as account opening dates, account types, frequency of use, sizes of accounts (e.g., amounts of data or services associated with accounts), and the like. Support content 146 generally includes content that can be provided to users during automated support sessions, such as answers to frequently asked questions, tutorials, links to helpful resources, and the like. Support tickets 148 are records of support sessions that are created by interactive support engine 122 and/or by assisted support professionals, including details related to support sessions such as the accounts to which the support sessions relate.

Ensemble model 126 may comprise a plurality of models that are trained using different sets of training data generated based on, for example, user activity data 142. Training of ensemble model 126 by model trainer 160 is described in more detail below with respect to FIG. 2. Once ensemble model 126 is trained, it is used by account prediction engine 124 to predict accounts related to support requests from users. In some embodiments ensemble model 126 is trained for a plurality of users (e.g., where accounts are abstracted to features of the accounts), while in other embodiments ensemble model 16 is trained for a specific user based on the accounts of that specific user.

In an embodiment, a user initiates a support session from a mobile device 130. For example, the user may be experiencing an issue of may have a question related to one of the user's accounts with application 162. Mobile device 130 may, for example, be a mobile phone, and the user may initiate a support session by calling a support line. In some embodiments, mobile device 130 may represent a computing device through which the user initiates a support session, such as via a chat window of a native application or through a web application. Mobile device 130 may also be representative of a device through which the user interacts with application 162, and/or the user may interact with application 162 through one or more other client devices.

When the user initiates the support session, interactive support engine 122 receives support initiation 152, which may include information related to the support initiation, such as an identifier of the user (e.g., a phone number, username, device identifier, or the like) and a time at which the support session was initiated.

Interactive support engine 122 may access user account data 144 to determine if the user has more than one account. For example, user account data 144 may store mappings between phone numbers and user accounts. If the user has only one account, then interactive support engine 122 may determine that the user is seeking support about the one account, and proceed accordingly. However, if the user has multiple accounts, then interactive support engine 122 interacts with account prediction engine 124 to predict the account for which the user is seeking support.

Interactive support engine 122 provides the user identifier and support initiation time 154 to account prediction engine 124. Account prediction engine 124 then uses the user identifier and support initiation time to retrieve context data and generate input features to provide to ensemble model 126. In an example, account prediction engine 124 retrieves a subset of user activity data 142 that is associated with the user identifier from data store 140. Account prediction engine then generates sets of inputs for each model within ensemble model 126 based on the retrieved user activity data. For example, the input features may be generated based on time differences between times of user activities and the support initiation time.

In an embodiment, ensemble model 126 includes a first tree-based model that accepts a time difference between a most recent user activity and the support initiation time as an input. Tree-based models are described in more detail below with respect to FIG. 2.

In some embodiments, ensemble model 126 also includes a second tree-based model that accepts time differences between each of the n most recent user activities and the support initiation time as inputs. For example, n may be a fixed number that is greater than one and determined in advance.

In certain embodiments, ensemble model 126 also includes a third tree-based model that accepts time differences between each of the n most recent user activities and the support initiation time, as well as embedded representations of the page names on which the n most recent user activities took place and embedded representations of the user activities, as inputs. Embedded representations (e.g., embeddings) are described in more detail below with respect to FIG. 2.

Ensemble model 126 may also include a ranking model that also accepts time differences between each of the n most recent user activities and the support initiation time, as well as embedded representations of the page names on which the n most recent user activities took place and embedded representations of the user activities, as inputs.

Ensemble model 126 outputs a predicted account in response to the inputs provided to the various models. For example, each model in ensemble model 126 may output one or more predictions, such as in the form of a probability for each possible account. In some embodiments, an aggregation function is used to aggregate outputs from the models to produce a final output from ensemble model 126, such as though an averaging process that reduces variance. In one example, majority voting of the outputs from each of the models within ensemble model 126 is used to determine the predicted account. If there is a tie between accounts predicted by the models, in some embodiments the predicted account that has the most recent user activity is selected. If there is still a tie (e.g., if all predicted accounts have an equally recent user activity), then random selection between the predicted accounts may be used.

Account prediction engine 124 provides the account 156 predicted by ensemble model 126 to interactive support engine 122. In some embodiments, interactive support engine 122 opens a new support ticket 148 for the support session, including the account 156 in the support ticket 148.

In certain embodiments, interactive support engine 122 retrieves a subset of support content 146 to provide to mobile device 130, such as via audio in an interactive voice session or a chat session. For example, interactive support engine 122 may retrieve audio or text data that asks the user to confirm that they are requesting support for account 156. Interactive support engine 122 then provides support content 158 based on the account to mobile device 130 (e.g., during an automated support session). The user may then respond, such as by confirming that they are requesting support for account 156. In other embodiments, interactive support engine 122 provides account 156 to an assisted support professional, who then interacts with the user, such as asking the user to confirm that support is being requested for account 156.

In some embodiments, if the user confirms that they either are or are not requesting support for account 156, updated training data is generated based on the user's feedback and is used by model trainer 160 to re-train ensemble model 126. For example, batch re-training may be performed when the model is offline, such as after a threshold amount of new training data has been generated based on user feedback and/or at a time when the model is not in user. In other embodiments, online re-training of the model may be performed.

Example Ensemble Model for Account Prediction

Figure 2:
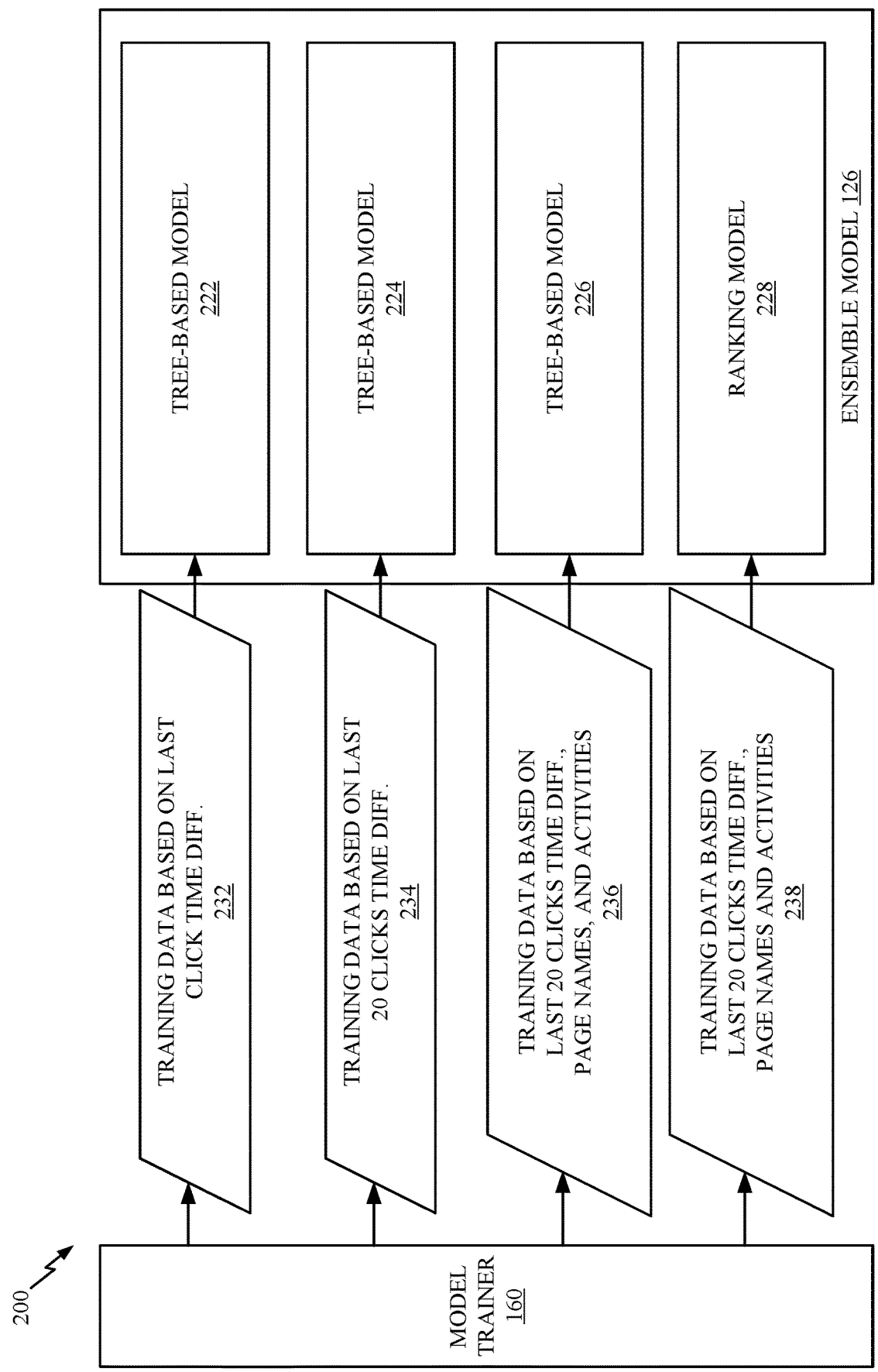
FIG. 2 depicts an example of training an ensemble model for account prediction.

FIG. 2 depicts an example embodiment 200 of training an ensemble model for account prediction.

In embodiment 200, model trainer 160 of FIG. 1 trains various models of ensemble model 126 of FIG. 1 using different sets of training data (e.g., 232, 234, 236, and 238). In this embodiment, ensemble model 126 includes three tree-based models 22, 224, and 226 and a ranking model 228. However, in other embodiments, different configurations may be used.

The tree-based models (222, 224, and 226) and ranking model (228) are example of machine learning models. Machine-learning models allow computing systems to improve and refine functionality without explicitly being programmed. Given a set of training data, a machine-learning model can generate and refine a function that determines a target attribute value based on one or more input features. For example, if a set of input features describes an automobile and the target value is the automobile's gas mileage, a machine-learning model can be trained to predict gas mileage based on the input features, such as the automobile's weight, tire size, number of cylinders, coefficient of drag, and engine displacement.

There are many different types of machine-learning models that can be used in embodiments of the present disclosure. For example, ensemble model 126 may be homogenous (i.e., using multiple member models of the same type) or non-homogenous (i.e., using multiple member models of different types). In various embodiments, individual machine-learning models ensemble model 126 may all be trained using the same subset of training data or may be trained using overlapping or non-overlapping subsets selected from the training data. In embodiment 200, ensemble model 126 is non-homogenous, containing different types of models, and these models are trained using different subsets of training data.

In certain embodiments, each of tree-based models 222, 224, and 226 comprise decision trees, such as in the form of gradient-boosted tree models.

A decision tree makes a classification by dividing inputs into smaller classifications (at nodes), which result in an ultimate classification at a leaf. Gradient boosting is a method for optimizing decision-tree based models. Gradient boosting generally involves building an ensemble of prediction models such as decision trees. The ensemble of prediction models making up the gradient boosted tree model may be built in a stage-wise fashion (e.g., iteratively improved through a series of stages), and the prediction models may be generalized to allow optimization of an arbitrary differentiable loss function. For example, each decision tree of a gradient boosted tree model may be trained based on associations between input features corresponding to historical support sessions in the training data and labels indicating accounts related to the support sessions, determined from the training data.

In the depicted embodiment, a first tree-based model 222 of ensemble model 126 is trained using training data 232 that is based on a last click time difference. For example, training data 232 may include a difference between a time of a last click by various users prior to support initiation times from historical support sessions. Each time difference is associated in training data 232 with a label indicating whether the last click was associated with the account to which the historical support session related. For example, the user and/or a support professional may have confirmed the account related to the historical support session, and this account may be used to determine labels for all features related to the historical support session.

A second tree-based model 224 of ensemble model 126 is trained using training data 234 that is based on differences between each of the last 20 clicks by various users prior to support initiation times from historical support sessions. A "click" may, for instance, refer to a click on a user interface element. For example, for a given historical support session, the last 20 clicks performed by the corresponding user prior to the support initiation time may be identified, the time difference between each of the 20 clicks and the support initiation time may be determined, and each time difference may be associated with a label indicating whether the corresponding click was associated with the account to which the historical support session related.

A third tree-based model 226 of ensemble model 126 is trained using training data 236 that is based on the differences between each of the last 20 clicks by various users prior to support initiation times from historical support sessions and based on page names and activities associated with the last 20 clicks.

In some embodiments, "embeddings" of the page names and activities are generated by determining n-dimensional vectors representing page names and activities as vectors in n-dimensional space. In some embodiments, an autoencoder with one or more long short-term memory (LSTM) layers is used to generate vector representations of text sequences (e.g., page names and activity names). LSTM layers may be used, for instance, because the ordering of words in text sequences matters.

An autoencoder is a type of artificial neural network that is used to learn efficient data embeddings in an unsupervised manner. The goal of an autoencoder is to learn a representation (embedding) for a set of data, typically for dimensionality reduction, by training the network to ignore signal "noise". Neural networks generally include a plurality of connected units or nodes called artificial neurons. Each node generally has one or more inputs with associated weights, a net input function, and an activation function. Nodes are generally included in a plurality of connected layers, where nodes of one layer are connected to nodes of another layer, with various parameters governing the relationships between nodes and layers and the operation of the neural network. Each node or neuron in an LSTM layer generally includes a cell, an input gate, an output gate and a forget gate. The cell generally stores or "remembers" values over certain time intervals in both a backward direction (e.g., data input to the node) and a forward direction (e.g., data output by the node), and the gates regulate the flow of data into and out of the cell. As such, an LSTM layer hones a representation by modifying vectors based on remembered data, thereby providing a more contextualized representation of a text sequence.

A ranking model 228 of ensemble model 126 is trained using training data 238 that is based on the differences between each of the last 20 clicks by various users prior to support initiation times from historical support sessions and based on the page names and activities associated with the last 20 clicks. In some embodiments, ranking model 228 generates its own embeddings of page names and activities, and so embeddings do not need to be generated prior to providing inputs to ranking model 228. In some embodiments, as described below with respect to FIG. 3, ranking model 228 is a neural network ranking model that includes one or more LSTM layers for refining embeddings. In one embodiment, ranking model 228 utilized the TensorFlow platform. On the TensorFlow platform, computations are expressed as stateful dataflow graphs. The name TensorFlow derives from the operations that such neural networks perform on multidimensional data arrays, which are referred to as tensors.

In some embodiments, training data 232, 234, 236, and/or 238 also include account context features related to accounts of users that initiated historical support sessions, the account context features being associated with labels indicating whether the account context features relate to the account to which a given historical support session related. Account context features may include, for example, whether an account is a high value account (e.g., having a value over a threshold), whether an account is an online account, whether an account is associated with a particular version of an application, a time since a last modification to an account (relative to the support initiation time), a time since a last click for the account (relative to the support initiation time), and the like.

Model trainer 160 generally performs operations related to training ensemble model 126. In some embodiments, training a given model of ensemble model 126 involves providing training inputs (e.g., features such as time differences between activities and support initiation times) to nodes of an input layer of a given model. The given model processes the training inputs through its various layers and outputs predicted accounts. The predicted accounts are compared to the labels associated with the training inputs to determine the accuracy of the given model, and parameters of the given model are iteratively adjusted until one or more conditions are met. For example, the conditions may relate to whether the predictions produced by the given model based on the training inputs match the labels associated with the training inputs or whether a measure of error between training iterations is not decreasing or not decreasing more than a threshold amount. The conditions may also include whether a training iteration limit has been reached. Parameters adjusted during training may include, for example, hyperparameters, values related to numbers of iterations, weights, functions used by nodes to calculate scores, and the like. In some embodiments, validation and testing are also performed for each model, such as based on validation data and test data, as is known in the art.

Example Ranking Model

Figure 3:
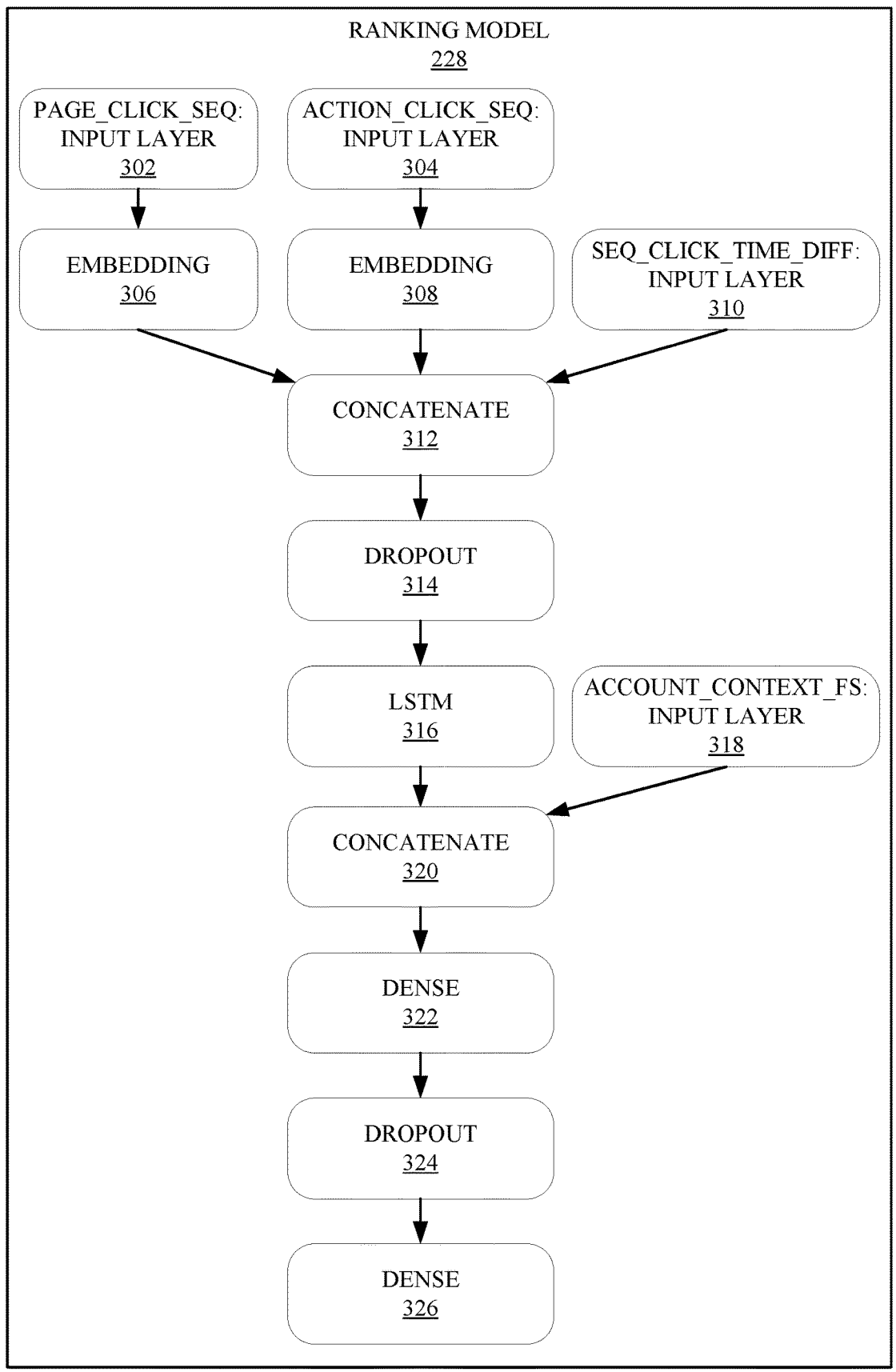
FIG. 3 depicts an example of a ranking model of an ensemble model for account prediction.

FIG. 3 depicts an example embodiment of a ranking model 228 of an ensemble model for account prediction. In particular, embodiment 300 illustrates aspects of ranking model 228 of FIG. 2, which is part of ensemble model 126 of FIG. 1. Embodiment 300 provides a high-level view of an example architecture of a ranking model. For example, ranking model 228 may be a neural network model such as utilizing the TensorFlow platform.

Ranking model 228 includes an input layer that accepts a sequence of page names on which clicks occurred at 302 (e.g., "PAGE_CLICK_SEQ") and a sequence of names of actions or activities associated with the clicks at 304 (e.g., "ACTION_CLICK_SEQ"). AT 306 and 308, embeddings of these sequences are generated. The input layer also accepts a sequence of time differences between clicks and support initiation times at 310 (e.g., "SEQ_CLICK_TIME_DIFF").

The time differences do no not need to be embedded, as they are already numerical features. At 312, the embeddings generated at 306 and 308 are concatenated with the time differences input at 310 (e.g., in a hidden layer of ranking model 228). At 314, a dropout layer processes output from the concatenation at 312. Dropout is a technique used to prevent a model from overfitting, and works by randomly setting outgoing edges of hidden units (neurons that make up hidden layers) to 0 at each update of the training phase.

At 316, an LSTM layer processes output from the dropout layer at 314. The input layer also accepts account context features at 318 (e.g., "ACCOUNT_CONTEXT_FS"). At 320, the output from the LSTM layer at 316 is concatenated with the account context features input at 318 (e.g., in a hidden layer of ranking model 228). At 322, a dense layer processes output from the concatenation at 320. A dense layer, also called a "fully connected" layer, is a layer in which every neuron is connected to every neuron in another layer. At 324, a dropout layer processes output from the dense layer at 322. At 326, a dense layer processes the output from the dropout layer at 324.

Ranking model 228 outputs a predicted account, which is used along with predicted accounts output by other models of ensemble model 126 of FIG. 1 to determine a final predicted account.

Example Operations for Training an Ensemble Model for Account Prediction

Figure 4:
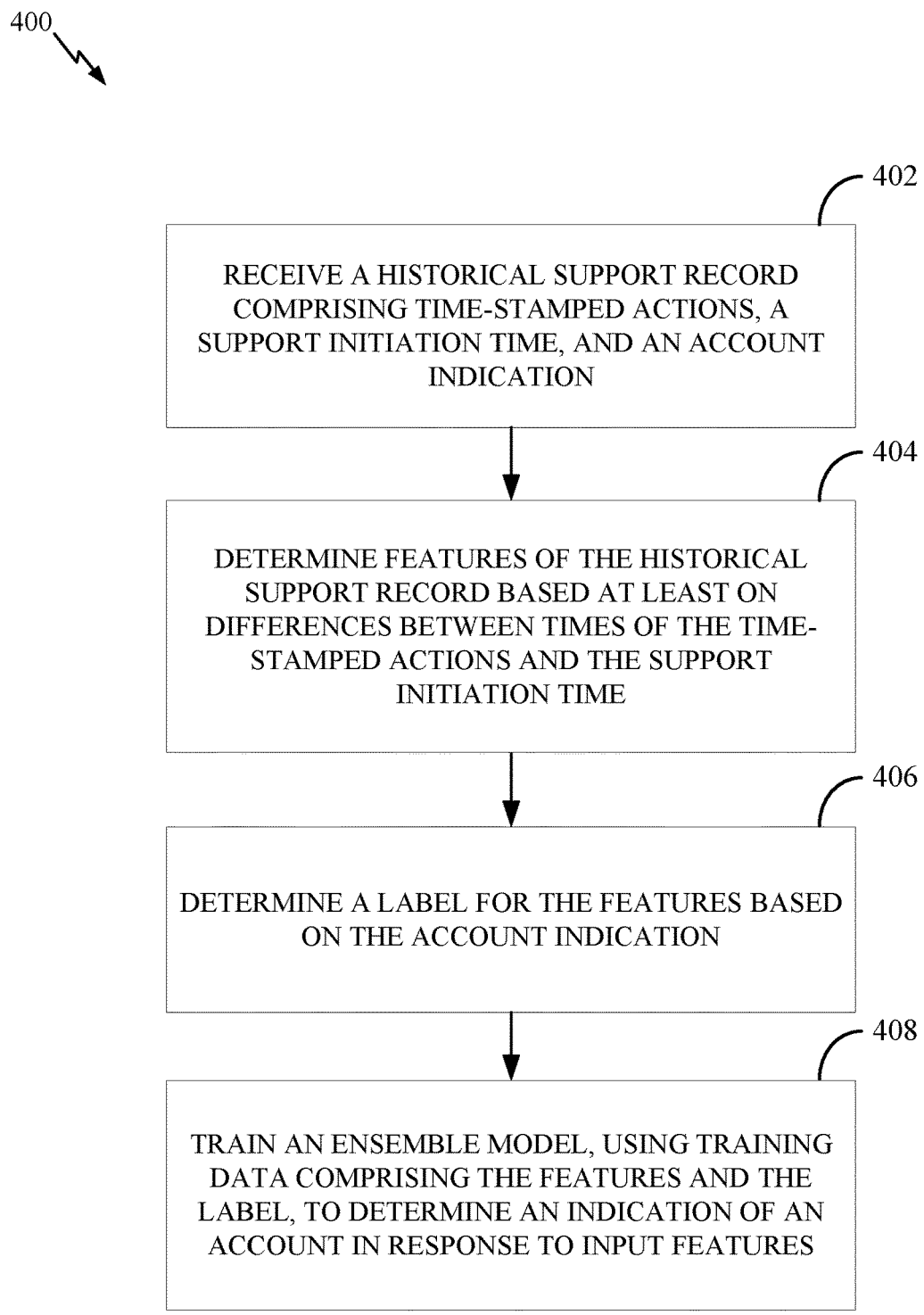
FIG. 4 depicts example operations for account prediction using machine learning.

FIG. 4 depicts example operations 400 for account prediction using machine learning. For example, operations 400 may be performed by model trainer 160 of FIG. 1, and may correspond to embodiment 200 of FIG. 2

At step 402, a historical support record is received comprising time-stamped actions, a support initiation time, and an account indication. An account indication may, for instance, be an identifier of an account and/or one or more features of an account.

At step 404, features of the historical support record are determined based at least on differences between times of the time-stamped actions and the support initiation time.

At step 406, a label is determined for the features based on the account indication. The label may, for instance include an identifier of the account and/or one or more features of the account.

At step 408, an ensemble model is trained, using labeled training data comprising the features and the label, such that the trained ensemble model is able to determine an indication of an account in response to input features. The ensemble model may comprise a plurality of tree-based models and a ranking model. In some embodiments, training the ensemble model comprises training a first tree-based model of the plurality of tree-based models based on a feature of the historical support record that corresponds to an action of the time-stamped actions that is closest in time to the support initiation time.

A second tree-based model of the plurality of tree-based models may also be trained based on given features of the historical support record that correspond to a plurality of actions of the time-stamped actions that are closest in time to the support initiation time. In some embodiments, embeddings of page names and actions corresponding to the given features are determined.

Training the ensemble model may further include training a third tree-based model of the plurality of tree-based models based on the given features and based on the embeddings of the page names and the actions corresponding to the given features.

Training the ensemble model may further comprise training the ranking model based on the given features, the page names, and the actions corresponding to the given features. The ranking model comprises one or more embedding layers and one or more long short-term memory (LSTM) layers. The ensemble model may determine the indication of the account in response to the input features based on majority voting of the first tree-based model, the second tree-based model, the third tree-based model, and the ranking model.

Example Operations for Account Prediction Using Machine Learning

Figure 5:
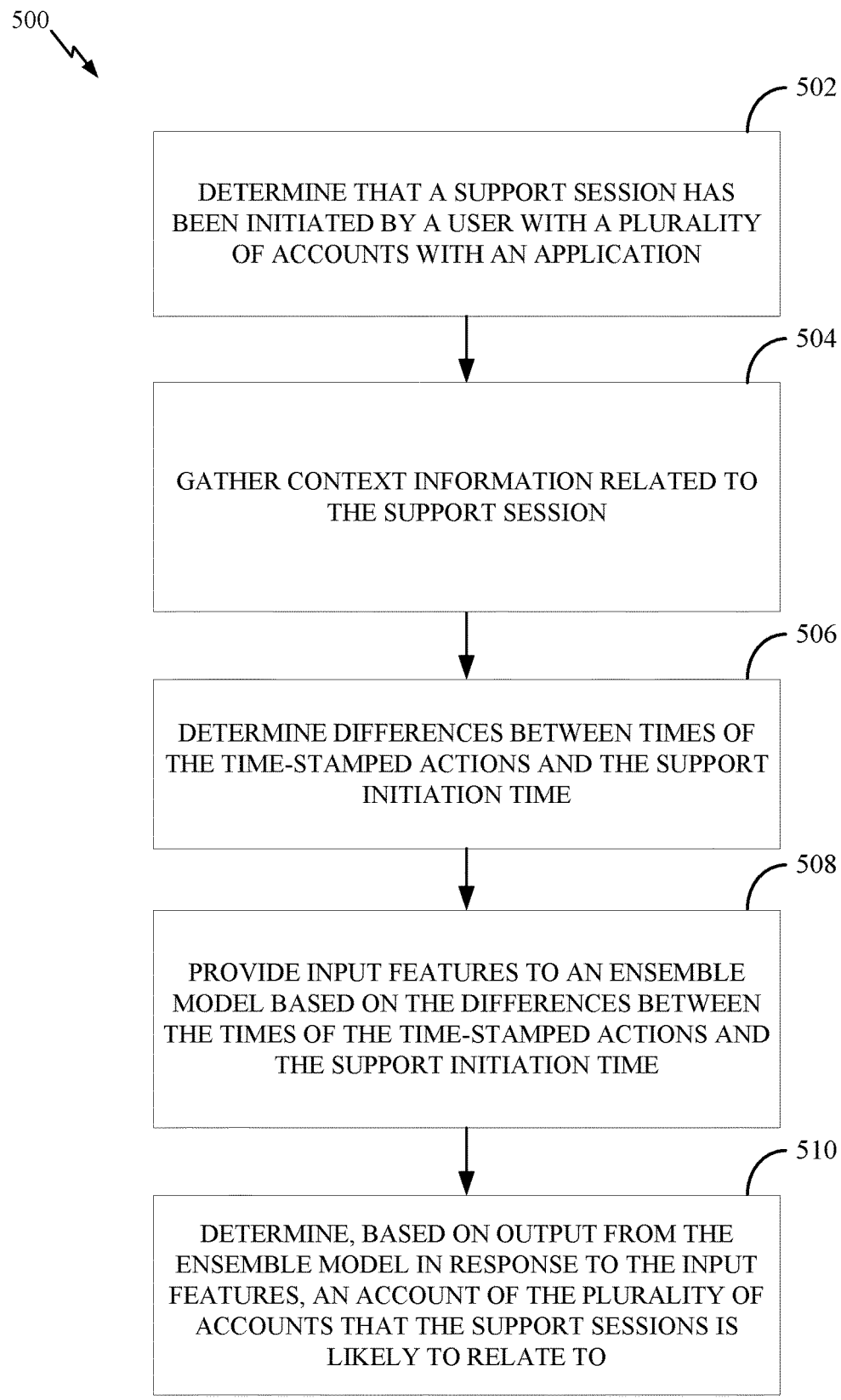
FIG. 5 depicts additional example operations for account prediction using machine learning.

FIG. 5 depicts additional example operations 500 for account prediction using machine learning. For example, operations 500 may be performed by interactive support engine 122 and/or account prediction engine 124 of FIG. 1.

At step 502, it is determined that a support session has been initiated by a user with a plurality of accounts with an application.

At step 504, context information related to the support session is gathered. In some embodiments, the context information includes: a support initiation time; and time-stamped actions preceding the support session.

At step 506, differences are determined between times of the time-stamped actions and the support initiation time.

At step 508, input features are provided to an ensemble model based on the differences between the times of the time-stamped actions and the support initiation time. For example, different subsets of the differences may be provided as input features to different models of the ensemble model.

In some embodiments, the ensemble model may comprise a plurality of tree-based models and a ranking model, such as described with respect to FIG. 2.

Providing the input features to the ensemble model may comprise providing, to one of the plurality of tree-based models, a feature of the input features that corresponds to an action of the time-stamped actions that is closest in time to the support initiation time. Providing the input features to the ensemble model may also comprises providing, to another one of the plurality of tree-based models, given features of the input features that correspond to a plurality of actions of the time-stamped actions that are closest in time to the support initiation time.

Providing the input features to the ensemble model may also comprise determining embeddings of page names and actions corresponding to the given features and providing, to another one of the plurality of tree-based models, the given features and the embeddings of the page names and the actions corresponding to the given features. Providing the input features to the ensemble model may further comprise providing, to the ranking model, the given features and additional features that are based on the page names and the actions corresponding to the given features. In some embodiments, the ranking model comprises one or more embedding layers and one or more long short-term memory (LSTM) layers. The account of the plurality of accounts may be determined based on majority voting of the first tree-based model, the second tree-based model, the third tree-based model, and the ranking model.

At step 510, an account of the plurality of accounts that the support sessions is likely to relate to is determined based on output from the ensemble model in response to the input features. Output from the ensemble model may, for example, include one or more probabilities with respect to one or more accounts. In some embodiments, the account of the plurality of accounts is further determined based on which account of two or more accounts has a most recent action.

Example Computing System

Figure 6:
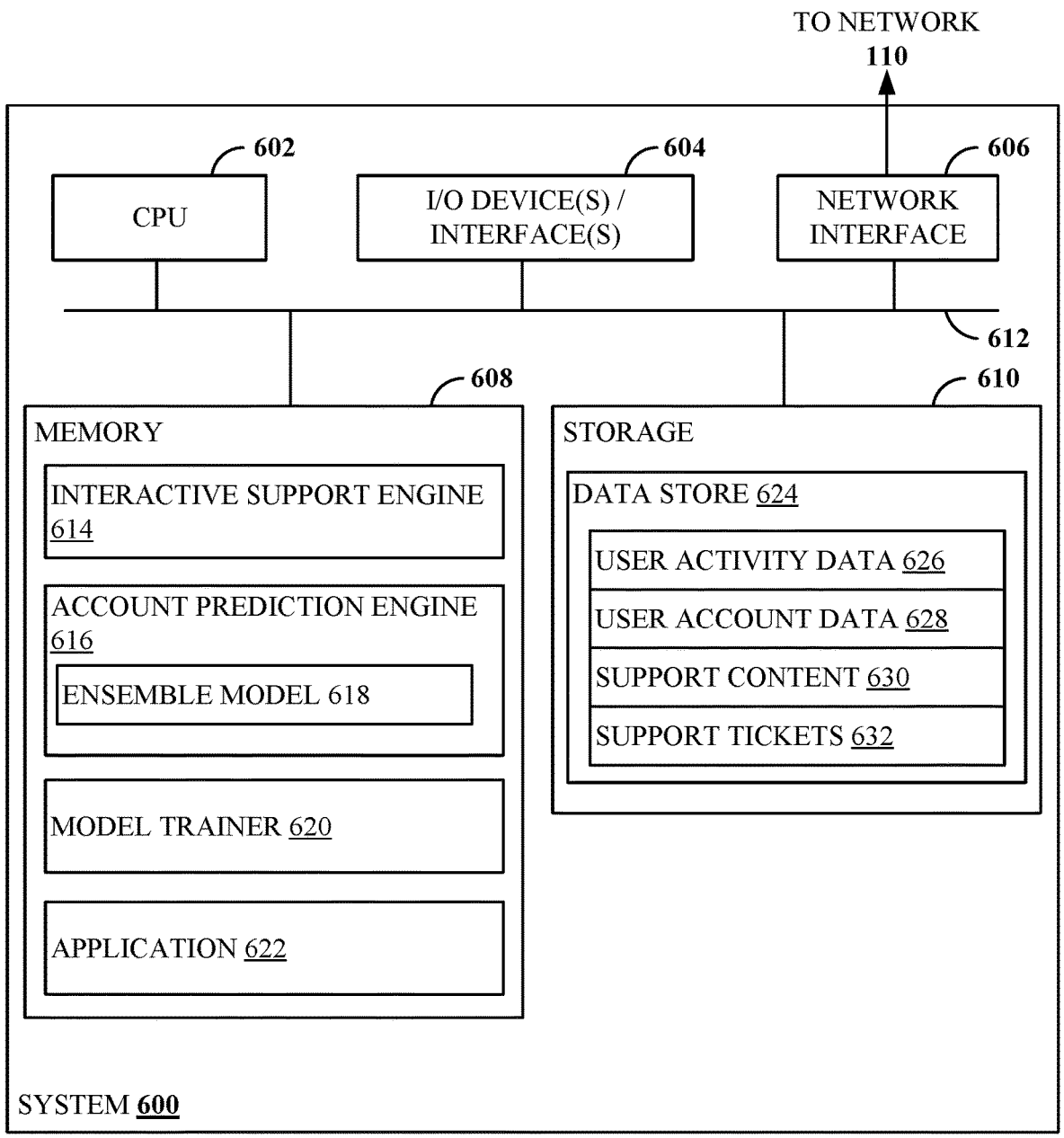
FIG. 6 depicts example an example processing system for account prediction using machine learning.

FIG. 6 illustrates an example system 600 with which embodiments of the present disclosure may be implemented. For example, system 600 may be representative of server 120 of FIG. 1.

System 600 includes a central processing unit (CPU) 602, one or more I/O device interfaces 604 that may allow for the connection of various I/O devices 614 (e.g., keyboards, displays, mouse devices, pen input, etc.) to the system 600, network interface 606, a memory 608, storage 610, and an interconnect 612. It is contemplated that one or more components of system 600 may be located remotely and accessed via a network 110. It is further contemplated that one or more components of system 600 may comprise physical components or virtualized components.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. CPU 602 is included to be representative of a single CPU, multiple CPUs, a single CPU having multiple processing cores, and other arrangements.

Additionally, the memory 608 is included to be representative of a random access memory. As shown, memory 608 includes interactive support engine 614, account prediction engine 616, ensemble model 618, model trainer 620, and application 622, which may be representative of interactive support engine 122 account prediction engine 124, ensemble model 126, model trainer 160, and application 162 of FIG. 1.

Storage 610 may be a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN).

Storage 610 comprises data store 624, which may be representative of data store 126 of FIG. 1. While data store 624 is depicted in local storage of system 600, it is noted that data store 624 may also be located remotely (e.g., at a location accessible over a network, such as the Internet). Data store 624 includes user activity data 626, user account data 628, support content 630, and support tickets 632, which may be representative of user activity data 142, user account data 144, support content 146, and support tickets 148 of FIG. 1.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for training a machine learning model, comprising:
   receiving a historical support record corresponding to a support session initiated by a user of a software application, the historical support record comprising a support initiation time, time-stamped actions that were performed by the user within the software application prior to the support initiation time, and an account indication, wherein the support initiation time comprises a time at which the user initiated the support session;
   determining features of the historical support record based at least on differences between times of the time-stamped actions and the support initiation time;
   determining a label for the features based on the account indication;
   generating, based on the features and the label, at least:
      a first training data set comprising the label and a first subset of the features including a time difference between the support initiation time and a time associated with an action of the time-stamped actions that is closest in time to the support initiation time;

a second training data set comprising the label and a second subset of the features including at least one feature that is not included in the first subset of the features; and a third training data set comprising the label and a third subset of the features including one or more features that are not included in the first subset of the features or the second subset of the features;

training an ensemble model, using the first training data set, the second training data set, and the third training data set, to determine an indication of an account in response to input features, wherein the ensemble model comprises a plurality of tree-based models and a ranking model, and wherein the training of the ensemble model comprises:

providing the first subset of the features as first inputs to a first tree-based model of the plurality of tree-based models;

providing the second subset of the features as second inputs to a second tree-based model of the plurality of tree-based models;

providing the third subset of the features as third inputs to the ranking model;

receiving outputs from the plurality of tree-based models and the ranking model based on the first inputs, the second inputs, and the third inputs; and iteratively adjusting the plurality of tree-based models and the ranking model based on comparing the outputs to the label;

after the training of the ensemble model, generating updated sets of training data based on user feedback with respect to an output from the ensemble model; and re-training the ensemble model based on the updated sets of training data.

2. The method of claim 1, wherein the second subset of the features comprises a second feature that corresponds to a plurality of actions of the time-stamped actions that are closest in time to the support initiation time.

3. The method of claim 2, further comprising determining embeddings of page names and actions corresponding to the second subset of the features, wherein training the ensemble model further comprises training a third tree-based model of the plurality of tree-based models based on the second subset of the features and based on the embeddings of the page names and the actions corresponding to the second subset of the features.

4. The method of claim 3, wherein training the ensemble model further comprises training the ranking model based on the second subset of the features, the page names, and the actions corresponding to the second subset of the features.

5. The method of claim 4, wherein the ensemble model determines the indication of the account in response to the input features based on majority voting of the first tree-based model, the second tree-based model, the third tree-based model, and the ranking model.

6. The method of claim 1, wherein the ranking model comprises one or more embedding layers and one or more long short-term memory (LSTM) layers.

7. A method for account prediction using a trained ensemble model, comprising:

determining that a support session has been initiated by a user with a plurality of accounts with an application;

gathering context information related to the support session, wherein the context information includes:

a support initiation time, wherein the support initiation time comprises a time at which the user initiated the support session; and time-stamped actions that were performed by the user within the application prior to the support initiation time;

determining differences between times of the time-stamped actions and the support initiation time;

providing input features to an ensemble model based on the differences between the times of the time-stamped actions and the support initiation time, wherein the ensemble model comprises a plurality of tree-based models and a ranking model, and wherein the ensemble model has been trained through a supervised learning process comprising:

providing a first set of features as first inputs to a first tree-based model of the plurality of tree-based models, wherein the first set of features includes a time difference between the support initiation time and a time associated with an action of the time-stamped actions that is closest in time to the support initiation time;

providing a second set of features including at least one feature that is not included in the first set of features as second inputs to a second tree-based model of the plurality of tree-based models;

providing a third set of features including one or more features that are not included in the first set of features or the second set of features as third inputs to the ranking model;

receiving outputs from the plurality of tree-based models and the ranking model based on the first inputs, the second inputs, and the third inputs; and iteratively adjusting the plurality of tree-based models and the ranking model based on comparing the outputs to a label associated with the first set of features, the second set of features, and the third set of features;

determining, based on an output from the ensemble model in response to the input features, an account of the plurality of accounts that the support sessions is likely to relate to; and receiving user feedback with respect to the output, wherein the ensemble model is re-trained based on the user feedback.

8. The method of claim 7, wherein providing the input features to the ensemble model comprises providing, to the second tree-based model of the plurality of tree-based models, a subset of the input features that correspond to a plurality of actions of the time-stamped actions that are closest in time to the support initiation time.

9. The method of claim 8, wherein providing the input features to the ensemble model comprises:

determining embeddings of page names and actions corresponding to the subset of the input features; and providing, to a third tree-based model of the plurality of tree-based models, the subset of the input features and the embeddings of the page names and the actions corresponding to the subset of the input features.

10. The method of claim 9, wherein providing the input features to the ensemble model comprises providing, to the ranking model, the subset of the input features and additional features that are based on the page names and the actions corresponding to the subset of the input features.

11. The method of claim 10, wherein the account of the plurality of accounts is determined based on majority voting of the first tree-based model, the second tree-based model, the third tree-based model, and the ranking model.

12. The method of claim 11, wherein the account of the plurality of accounts is further determined based on which account of two or more accounts has a most recent action.

13. The method of claim 1, wherein the ranking model comprises one or more embedding layers and one or more long short-term memory (LSTM) layers.

14. A system, comprising: one or more processors; and a memory comprising instructions that, when executed by the one or more processors, cause the system to perform a method for training a machine learning model, the method comprising:
receiving a historical support record corresponding to a support session initiated by a user of a software application, the historical support record comprising a support initiation time, time-stamped actions that were performed by the user within the software application prior to the support initiation time, and an account indication, wherein the support initiation time comprises a time at which the user initiated the support session;
determining features of the historical support record based at least on differences between times of the time-stamped actions and the support initiation time;
determining a label for the features based on the account indication;
generating, based on the features and the label, at least:
a first training data set comprising the label and a first subset of the features including a time difference between the support initiation time and a time associated with an action of the time-stamped actions that is closest in time to the support initiation time;
a second training data set comprising the label and a second subset of the features including at least one feature that is not included in the first subset of the features; and
a third training data set comprising the label and a third subset of the features including one or more features that are not included in the first subset of the features or the second subset of the features;
training an ensemble model, using the first training data set, the second training data set, and the third training data set, to determine an indication of an account in response to input features, wherein the ensemble model comprises a plurality of tree-based models and a ranking model, and wherein the training of the ensemble model comprises:
providing the first subset of the features as first inputs to a first tree-based model of the plurality of tree-based models;
providing the second subset of the features as second inputs to a second tree-based model of the plurality of tree-based models;
providing the third subset of the features as third inputs to the ranking model;
receiving outputs from the plurality of tree-based models and the ranking model based on the first inputs, the second inputs, and the third inputs; and
iteratively adjusting the plurality of tree-based models and the ranking model based on comparing the outputs to the label;
after the training of the ensemble model, generating updated sets of training data based on user feedback with respect to an output from the ensemble model; and
re-training the ensemble model based on the updated sets of training data.

15. The system of claim 14, wherein the second subset of the features comprises a second feature that corresponds to a plurality of actions of the time-stamped actions that are closest in time to the support initiation time.

16. The system of claim 15, wherein the method further comprises determining embeddings of page names and actions corresponding to the second subset of the features, wherein training the ensemble model further comprises training a third tree-based model of the plurality of tree-based models based on the second subset of the features and based on the embeddings of the page names and the actions corresponding to the second subset of the features.

17. The system of claim 16, wherein training the ensemble model further comprises training the ranking model based on the second subset of the features, the page names, and the actions corresponding to the second subset of the features.

* * * * *